United States Patent
Mariani

[11] 3,829,675
[45] Aug. 13, 1974

[54] LIGHTING MEANS FOR UNDERWATER ILLUMINATION

[76] Inventor: Remo Mariani, 966 Quartz Dr., Toms River, N.J. 08753

[22] Filed: Apr. 30, 1973

[21] Appl. No.: 355,817

[52] U.S. Cl. ............... 240/1 LP, 240/26, 340/380, 350/96 R
[51] Int. Cl. ............................................. F21
[58] Field of Search ............... 240/1 LP, 1 EL, 26; 340/380; 350/96 R

[56] References Cited
UNITED STATES PATENTS

| | | | |
|---|---|---|---|
| 2,468,833 | 5/1949 | Murphy | 350/96 R |
| 3,264,462 | 8/1966 | Haggstrom | 240/1 EL |
| 3,441,957 | 4/1969 | Friedman | 240/26 |

Primary Examiner—Richard L. Moses
Attorney, Agent, or Firm—Jesse Woldman

[57] ABSTRACT

Light rays emanating from a light source within a recess in one end of a solid transparent elongate member are concentrated within and longitudinally conducted along a first portion thereof having a smooth, preferably polished outer surface, and then radiated from the roughened outer surface of a second portion extending longitudinally from the first portion, to provide directionally controlled selective illumination remote from the light source. Clamp means may be provided to attach the elongate member to the side of a liquid containing vessel such as a swimming pool or aquarium to selectively position the second portion of the elongate member beneath the surface of the liquid to safely illuminate the surrounding area.

4 Claims, 9 Drawing Figures

PATENTED AUG 13 1974　　　　　　　　　　　　3,829,675

LIGHTING MEANS FOR UNDERWATER ILLUMINATION

BACKGROUND OF THE INVENTION

1. Field of the Invention

The invention is directed to the field of illuminating devices and specifically to means for directionally controlling the path and radiation zone of light rays emanating from a remotely located light source.

2. Description of the Prior Art

Devices for providing illumination are well known and generally include electrically energized light sources such as incandescent, fluorescent, and carbon-arc lamps in a wide variety of forms and output ranges. Although these devices are generally satisfactory for use in general application such as room or area lighting under normal conditions, extensive precautions must be taken to adapt them for use, for example, in liquid environments where the lighting device must be properly sealed to prevent its exposure to moisture and electrically insulated from the environment to avoid exposing a body in such environment to the hazard of electrical shock. A typical application necessitating such precautions is the increasingly popular employment of underwater lighting in below ground pools for home and public use, and decorative lighting of aquariums and the like. In the former application, the lamp-containing enclosure must be set into the side of the pool wall, below the water surface, and tightly insulated and sealed, both mechanically and electrically, to prevent exposing the enclosed lamp to moisture and contact by bodies within the water, and, more importantly, to prevent creating a serious electrical shock hazard to individuals within the pool. The installation of such conventional lighting devices in an existing pool enclosure becomes, of necessity, an extremely time-consuming, expensive, and tedious operation, requiring, firstly, emptying the pool of existing water, and thereafter cutting, shearing, or otherwise breaking through the pool wall to install the lighting device therein, while further providing for lamp replacement, when necessary. The mounting of such light sources in the pool wall has the further disadvantage of creating a relatively narrow, concentrated area of illumination, since the light source is inset behind the plane of the pool wall, resulting in a relatively restrictive angle of illumination.

SUMMARY OF THE INVENTION

The present invention overcomes the difficulties and limitations noted above with respect to prior art devices by providing a means for safely, rapidly, inexpensively, and conveniently supplying selective illumination remote from a light source as, for example, within a body of water or the like. A transparent solid rod of material such as plastic or the like is provided with a lamp receiving recess in one end thereof within which is selectively positioned a light source such as, for example, an incandescent lamp which may be conveniently energized either from a battery or an external a.c. power supply. Where desired, mounting means may be provided for selectively maintaining the lamp in position within the recess, and removable cap means, which may also include a reflective interior surface, may be provided to protect the lamp and recessed area from inadvertent contact and exposure. The rod, which may be either straight, or formed into an L-shaped or U-shaped configuration, comprises a first portion having a smooth, preferably polished, outer surface extending from the recessed end of the rod to a second portion having a roughened outer surface. In one embodiment, the rod is of generally uniform cross section throughout, while in another embodiment the roughened surface second portion is enlarged to define a bulb-like configuration to increase the light radiating surface area. In a further embodiment, both ends of the rod are recessed and each recess is provided with a light source therein, and the rod selectively formed to define a generally U-shaped member with the roughened surface portion located at the bight of the U. The free ends of the rod may then be disposed at right angles to the plane of the U to permit the device to be placed over the rim or edge of a pool or aquarium wall with the light radiating roughened surface portion disposed beneath the surface of the water a predetermined depth. The device may also be adapted for hand-held operation or provided with means for attaching it to a suitable support member.

The light rays emanating from the light source are selectively concentrated and longitudinally conducted internally along the length of the first or smooth surface portion of the rod since the internal rays striking the smooth exterior surface at an oblique angle are reflected back and forth within the interior of the rod and continue in a zig-zag manner towards the second or roughened surface portion of the rod. The roughened exterior surface of the second portion of the rod presents a multitude of extremely small planar surfaces or facets many of which are planarly oriented normal to the direction of the light rays impinging thereon, permitting the rays to penetrate through the surface and provide a relatively uniform dispersion of diffused light therefrom, to illuminate the surrounding area. It is therefore an object of this invention to provide a novel illumination device.

It is another object of this invention to provide a means for selectively controlling the direction and dispersion of light rays.

It is a further object of this invention to provide means for selectively directing the path of light rays to illuminate an area remote from a light source.

It is still a further object of this invention to illuminate an area within a body of liquid from a light source remote therefrom.

It is yet another object of this invention to provide means for generally uniformly illuminating an area within a body of water from an electrically energized light source remote therefrom.

It is yet a further object of this invention to provide selectively controlled underwater illumination free from electrical and mechanical shock hazards.

Other objects and features will be pointed out in the following description and claims and illustrated in the accompanying drawings which disclose, by way of example, the principles of the invention and the best modes contemplated for carrying them out.

BRIEF DESCRIPTION OF THE DRAWINGS

Similar elements are given similar reference characters in each of the respective drawings.

DESCRIPTION OF THE PREFERRED EMBODIMENTS

Figure 1:
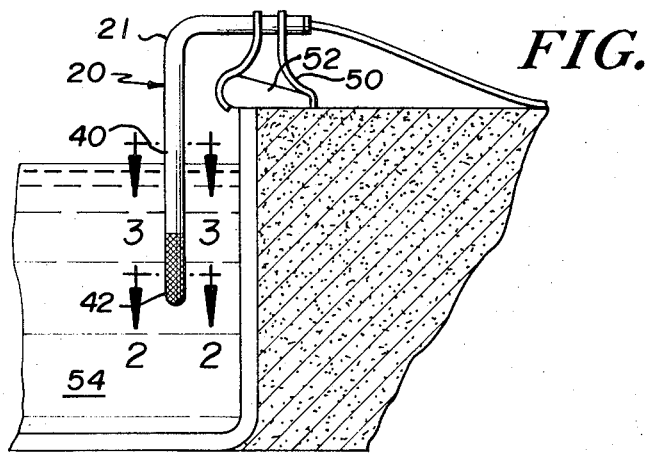
FIG. 1 is a fragmentary side elevational view of an illuminating device constructed in accordance with the concepts of the invention, illustrating its employment as an underwater lighting device.
Figure 2:
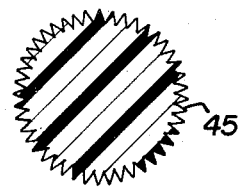
FIG. 2 is an enlarged cross sectional view of the device of FIG. 1 taken along the line 2—2.
Figure 3:
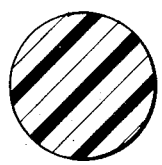
FIG. 3 is an enlarged cross sectional view of the device of FIG. 1 taken along the line 3—3.
Figure 4:
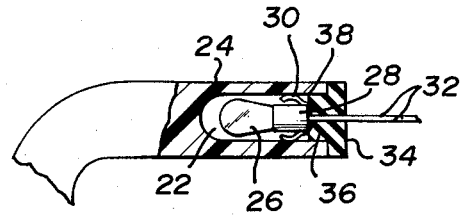
FIG. 4 is a fragmentary side elevational view, partly in section, of one end of the device of FIG. 1, showing a light source positioned in a recess therein.

Turning now to FIGS. 1, 2, 3 and 4, there is shown an illuminating device 20 constructed in accordance with the concepts of the invention. The illuminating device 20 comprises a generally elongate rod-like solid member 21 formed from transparent plastic material such as, for example, Lucite or the like, and having a selectively formed recess 22 (FIG. 4) extending longitudinally within a first end 24. Selectively positioned within recess 22 is a light source 26. The light source 26 may include a filament-type incandescent lamp, or iodine vapor lamp or other gas discharge light source. Disposed about the base of the light source 26 is a socket 28 having a pair of deflectable spring arms 30 arranged to frictionally engage the inner wall of recess 22, thereby providing a convenient means for enabling the light source 26 to be selectively maintained in position within recess 22 and readily removed, replaced, and reinserted therewithin. Extending from the socket 28 is a pair of preferably insulated electrical leads 32 which may be attached to a conventional electrical source of energy such as an a.c. supply or battery pack (not shown). Attached to the end 24 of member 21 adjacent the rear of recess 22 is a removable cap-like member 34 which, although shown as frictionally fitted to the end 24, may alternatively be threadably assembled thereto to provide a seal thereat. A first portion 36 of cap 34 extends partially into the recess 22 and may be provided with a preferably concave reflective surface 38 facing interiorly towards the light source 26. The light rays impinging on the surface 38 may thus be selectively redirected longitudinally back towards the forward or left end of recess 22, as seen in FIG. 4. Member 21 has a smooth, preferably polished exterior surface extending the length of a first portion 40 originating at the first end of 24 and terminating at the beginning of a second or light radiating portion 42 which extends to the opposite end of member 21. The exterior surface of the second portion is roughened, as indicated at 45 in FIG. 2, to provide a multitude of randomly oriented, generally planar facets, the purpose of which is explained in further detail below. As further shown in FIGS. 2 and 3, member 21 has a generally cylindrical cross section, but may be longitudinally fluted as at 46 in FIG. 6, or provided with an elliptical or oval cross sectional configuration, without departing from the spirit of the invention and within the concepts herein disclosed. The light radiating second portion 42 of member 21 may be enlarged to provide a bulb-like configuration as at 48 in FIG. 5, which may be employed either to increase the light radiating surface area, or to alter the light radiating pattern, where necessary or desirable.

Figure 5:
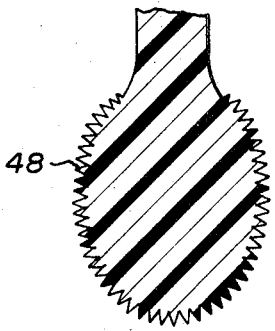
FIG. 5 is a fragmentary view, in section, of a further embodiment of the light radiating end of an illuminating device constructed in accordance with the concepts of the invention.
Figure 6:
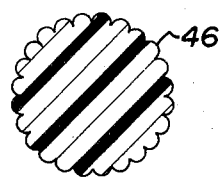
FIG. 6 is a cross sectional view of a further embodiment of a portion of an illuminating device constructed in accordance with the concepts of the invention.

Upon energization of the light source 26, light rays emanating therefrom are concentrated within the interior of member 21 and are directed generally longitudinally along its first portion 40, since the internal rays striking the interior of the smooth surface of member 21 at an oblique angle to the plane thereof are reflected back towards the interior of member 21 and re-reflected from the opposite side in a similar manner to describe a generally zig-zag path towards the second portion 42. Upon reaching the second portion 42, the light rays striking those facets which are planarly oriented normal to the path of such rays proceed through the surface of member 21 in a substantially uniformly diffused array to illuminate the surrounding area. Enlarging the contour of the light radiating second portion, as at 48 in FIG. 5, provides an increased surface area and an increased diffusion of the light rays emanating therefrom. As further illustrated in FIG. 1, member 21 may be formed to define a generally L-shaped structure wherein clamp means such as 50 may be provided for attaching it to a rim or edge 52 of a liquid containing vessel such as 54, which may include a swimming pool or aquarium, to provide effective, safe, and convenient underwater illumination within the area surrounding the light radiating second portion 42. A variety of interesting effects may be achieved by suitably coloring the roughened surface of the second portion 42 or 48 to provide light of almost any desired hue or shade. A similar effect may be obtained by employing lamps of different color outputs as the light source 26. The ease and convenience with which the light source 26 may be replaced without disturbing the position or location of member 21 provides an additional measure of utility and convenience highly desirable in many applications. It will, of course, be readily appreciated that, due to the insulative nature of the material employed to form the instant device, the temperature of the liquid in which the light radiating portion of the device is immersed will have practically no effect on the life, durability, or output of the light source 26.

Figure 7:
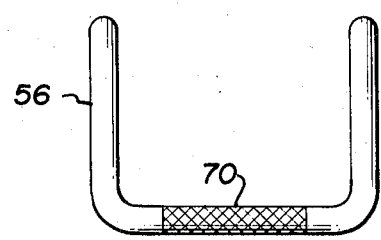
FIG. 7 is a front elevational view of another embodiment of an illuminating device constructed in accordance with the concepts of the invention.
Figure 8:
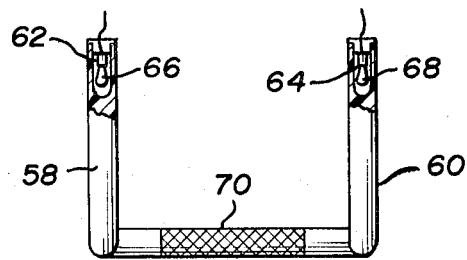
FIG. 8 is a partly cut-away top plan view, partly in section, of the device of FIG. 7.
Figure 9:
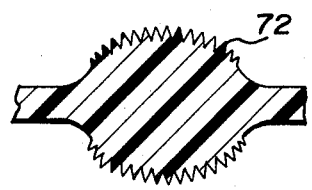
FIG. 9 is an enlarged fragmentary cross sectional view of another embodiment of the central portion of the device of FIG. 7 constructed in accordance with the concepts of the invention.

Referring now to FIGS. 7 and 8, an alternative construction of an illuminating device constructed in accordance with the concepts of the invention includes a generally U-shaped elongate member 56 the parallel ends 58, 60, of which are axially disposed at right angles to the plane of the U-shaped section of member 56. Each of the ends 58, 60 is provided with a recess 62, 64, respectively, similar to the recess 22 shown in FIG. 4, each recess 62, 64 having mounted therein a light source 66, 68, respectively, similar to light source 26 illustrated in FIG. 4, thus providing a dual light source which may be advantageously employed to furnish increased light output, where necessary or desirable. The instant embodiment may also be effectively utilized to provide unique lighting effects where the light sources 66, 68 furnish differently colored outputs. As with member 21 of FIG. 1, member 56 has a generally smooth outer surface except for a generally centrally disposed portion 70 having a roughened outer surface corresponding to the second portion 42 of member 21, and serving to provide diffused illumination therefrom in a manner essentially as described above with respect to the former embodiment. Light rays emanating from each of the light sources 66, 68 are thus concentrated and conducted longitudinally along each of the respective lengths of member 56 extending from each light source to the central portion 70 and emitted in a diffused pattern therefrom. The light emitted from the central portion 70 is thus a mixture of the light originating at each light source 66, 68, whereby, by suitably selecting the intensity and color of each of the respective light sources, varying lighting effects may be readily achieved. The central portion 70 may be enlarged, as at 72 in FIG. 9, to provide a bulb-like configuration essentially duplicative of the embodiment illustrated in FIG. 5, and similarly serving to provide an increased light radiating surface.

Although only generally U-shaped and L-shaped embodiments of the invention have been shown and described, it should be understood that the device may be formed in a variety of other shapes employing both straight and curved portions of selective lengths within the concepts herein disclosed. Depending upon the particular material employed, the specific shape desired may be obtained either by molding, hot-forming, or other similar processes. Roughening of selective portions of the surface of the elongate member may be achieved by sanding, grinding, etching, shot-peening, or other well-known surface abrading processes. By way of example, and for purposes of illustration only, the elongate member may be manufactured by providing a selective length of plastic material molded or turned to the desired diameter and cut into predetermined lengths. The outer surface of the light conducting portion may then be polished or otherwise treated to provide a relatively smooth finish over a predetermined length, and the outer surface of the light radiating portion sanded, etched, or abraded to a depth as shown, for example, one or two thousandths of an inch to provide the necessary roughness thereat.

The embodiments of the invention in which an exclusive property or privilege is claimed are defined as follows:

1. Illuminating means comprising: a first light source; and a generally solid integral elongate member formed from transparent material and having a selectively formed exterior surface and a first end having a first recess therein, said light source being selectively disposed within said first recess; said elongate member having a first portion having a first selective length and a second portion having a second selective length, said first portion extending longitudinally from said first end and having a smooth exterior surface, said second portion extending longitudinally from the end of said first portion and having a roughened exterior surface, said second portion being disposed generally remote from both ends of said elongate member whereby upon the energization of said first light source within said first recess, the light rays emanating therefrom are concentrated within and longitudinally conducted along said first portion of said elongate member and radiated from the roughened exterior surface of said second portion of said elongate member to illuminate the surrounding area thereat.

2. Illuminating means as defined in claim 1 wherein said elongate member has a second recess in the end thereof opposite said first end, and said illuminating means further comprises a second light source disposed in said second recess.

3. Illuminating means comprising: a first light source; a generally solid integral elongate member formed from transparent material and having a selectively formed exterior surface and a first end having a first recess therein, said light source being selectively disposed within said first recess; and means removably attached to said elongate member adjacent said first end thereof for sealing the opening formed by said first recess thereat, said elongate member having a first portion having a first selective length and a second portion having a second selective length, said first portion extending longitudinally from said first end and having a smooth exterior surface, said second portion extending longitudinally from the end of said first portion and having a roughened exterior surface, whereby upon the energization of said first light source disposed within said first recess, the light rays emanating therefrom are concentrated within and longitudinally conducted along said first portion of said elongate member and radiated from the roughened exterior surface of said second portion of said elongate member to illuminate the surrounding area thereat.

4. Illuminating means as defined in claim 3 wherein said means is a resilient member having a first portion extending partially into said first recess, said first portion having a generally concave reflective surface facing said first light source for redirecting the light rays impinging thereon in a path along the longitudinal axis of said elongate member.

* * * * *